Jan. 13, 1970 G. WAITZ ET AL 3,489,865
ROUTINERS FOR CHECKING TELEPHONE CIRCUITS
Filed June 22, 1966
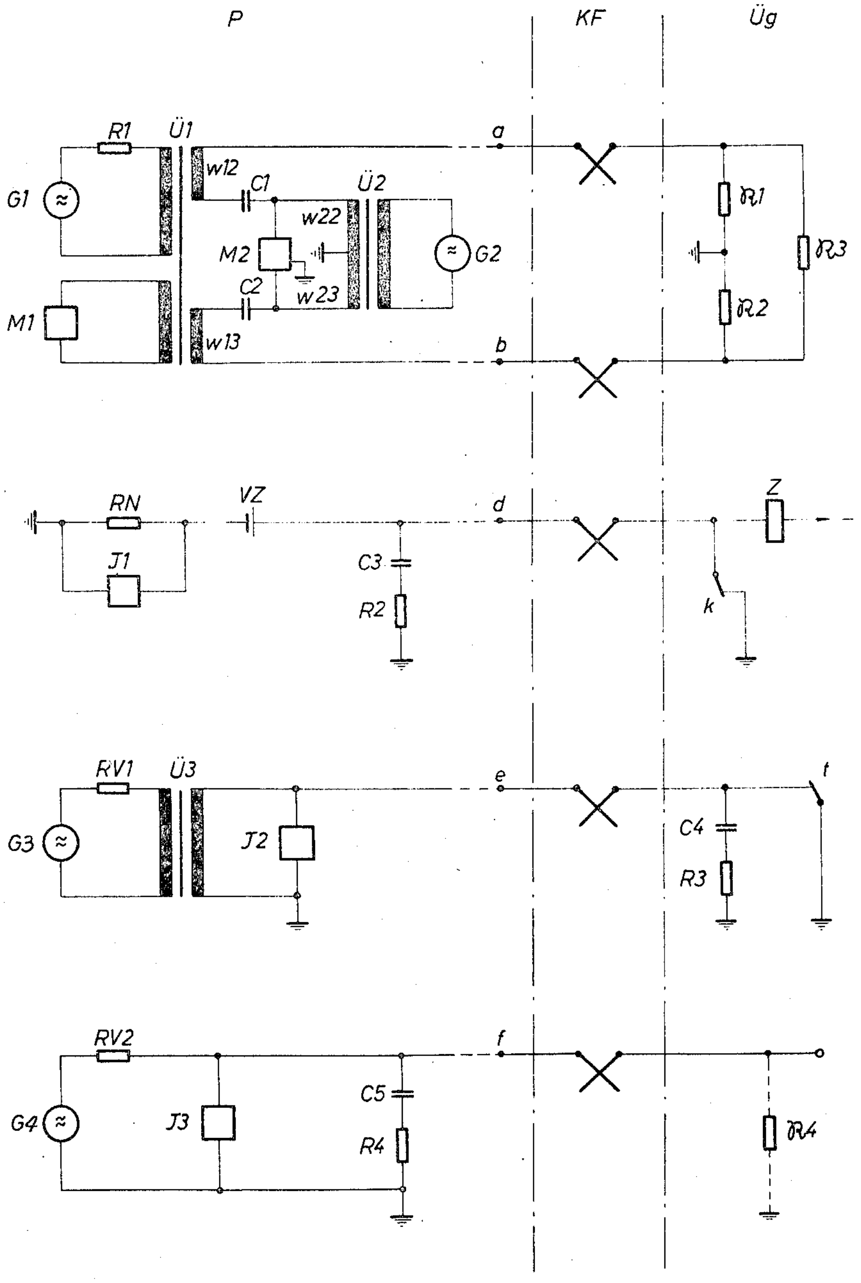

United States Patent Office 3,489,865
Patented Jan. 13, 1970

3,489,865

ROUTINERS FOR CHECKING TELEPHONE CIRCUITS

Gerhard Waitz, Kornwestheim, and Hans Treffinger, Oberaichen, Germany, assignors to International Standard Electric Corporation Filed June 22, 1966, Ser. No. 559,570
Claims priority, application Germany, June 25, 1965
St 24,031
Int. Cl. H04m 5/16
U.S. Cl. 179—175.11 8 Claims

ABSTRACT OF THE DISCLOSURE

Routiner circuitry that simultaneously checks the speech wires of a telephone circuit from the exchange side of a switching network to a remote repeater for leakage and symmetry. The signal wires are checked at the same time for opens, shorts or leakages.

The invention relates to telephone exchange systems and particularly to circuit arrangements or routiners for checking links in telephone exchange systems such as the links which are comprised of the lines extending between an exchange and repeaters.

Hitherto in checking links the individual wires of the connecting line were checked successively or a check was made to determine if there was a connection and if the checked wire was grounded or short-circuited. To this end, a relatively long checking period was necessary. Such extended periods of checking are, however, undesirable because frequently numerous links must be successively handled through a central checking device in routine checkings. A short checking period should be achieved, especially if the function of a switching grid must be checked during the establishment of a connection.

It is therefore the object of the invention to provide a circuit arrangement to check links in telephone exchange systems in which the link is checked as quickly as possible for conductivity and short-circuit to ground or short-circuits between wires of the links.

This is achieved, according to the invention, in that the speech wires and signal wires of a connection are checked by simultaneously measuring the leakage impedances and the symmetry of the leakage impedances using checking circuits in which between the signal wire and ground there are always RC elements. These RC elements effect an increase of the asymmetry at a shorted wire so that the symmetry measurement provides distinct results.

Such a routining system is most advantageously applied, when the links including the switching grids connected with outgoing repeaters are checked shortly before the cut-through order is given from the marker to the switching grid. Therefore, connecting links or route sections can be supervised before a call is established. A fault, possibly, occurring, may be reported at once.

There and other features of this invention and the manner of obtaining them will become more apparent, and the invention itself will be best understood by reference to the following description of an embodiment of the invention taken in conjunction with the accompanying drawing which schematically shows the inventive checking arrangement.

The single drawing shows a routiner or checking device P, capable of being connected to a link with the wires *a, b, d, e, f*. These wires lead to an outgoing repeater Ug via a switching grid KF. The actual mode of connecting the checking device to the wires is not material to the invention; any means well known to those skilled in the art such as relays or SCR's could be used.

A voltage with the frequency *f*1, is produced by a first generator G1, and applied to the primary winding of a transformer U1 via a resistor R1. The speech wires *a, b* are connected to secondary windings *w*12, *w*13 of transformer U1 respectively. The wires *a, b* are connected to the sides of the windings *w*12, *w*13 so that the currents in wires *a*, and *b* are always in the same direction. Capacitors C1, C2 are connected to the other sides of windings *w*12, *w*13 respectively, to render the checking circuit free from direct current. The capacitors are connected to two secondary windings *w*22, *w*23 of a second transformer U2, having opposite polarities and grounded at the common connecting point. The current of the frequency *f*1 flows through the windings *w*12, *w*13, load R3 which represents the impedance between wires *a, b* through the capacitors C1, C2 and the secondary windings *w*22, *w*23. Since these windings are of opposite sense or polarities no voltage is induced in the primary winding of transformer U2. The resistance of the windings appear only as ohmic resistance in the impedance checking circuit. Through a measuring facility M1, tuned to the frequency *f*1, the voltage drop, caused by load R3 is measured at the transformer U1. This measurement indicates the sufficiency of the impedance between wires *a* and *b*.

Simultaneously, further measurements are made to determine a single-sided wire interruption, a double-sider wire interruption or a short-circuit condition of both speech wires.

A single-sided wire interruption or a short-circuited speech wire is determined by checking on the symmetry of the circuit. To this end, a voltage with the frequency *f*2 is applied to the primary winding of the transformer U2 with the aid of a second generator G2. The voltages, induced in the secondary windings *w*22, *w*23, due to the voltage of generator G2 cause currents to flow in the opposite directions through the secondary windings *w*12, *w*13 of the transformer U1. The resistance of windings *w*12, *w*13 also appear in the symmetry checking circuit as ohmic series-resistances. The asymmetrical component of the voltages at the partial windings *w*22, *w*23 is a function of the resistance difference of the leakage resistors R1 and R2. This asymmetrical voltage component is measured by a measuring device M2 tuned to the frequency *f*2. It is assumed that the windings *w*22, *w*23 have relatively high ohmic resistances.

The measuring devices M1, M2 may include voltage meters; but they may also comprise suitable devices with predetermined response thresholds for go-no-go indications.

In a modification of the symmetrical checking arrangement, a choke, not shown on the drawing, may be used instead of the second transformer U2, the winding of the choke replacing the secondary winding of the second transformer. The center of the choke winding must then be grounded via the second generator G2. When a choke is used, the choke winding halves are not operated with opposite polarities but with the same polarity in order to preclude the possibility of the choke influencing the impedance measurements. In addition, a series-resonant circuit, tuned to the frequency *f*1, and connected in parallel to the choke winding may be used. Measurements are then made at the choke winding. Of course, it is again assumed that the choke winding has a considerable ohmic resistance. A short-circuit of a choke winding half, caused by the shunt of a wire with ground, is thus not transformed to the other half of the choke winding; therefore, a sufficiently high measuring voltage appears.

In order to recognize distinctly by the symmetrical checking a short-circuit of a speech wire with a signal wire *d, e, f*, an RC element is arranged in the checking device P between the signal wire and ground, if such an element does not already exist in the outgoing repeater Ug. In the checking device P the element C3, R2 is connected to signal wire *d* and the element C5, R4 to the signal wire *f* while the element C4, R3 is shown connected to the signal wire *e* in the repeater Ug. These RC elements aid in determining a short-circuit among the signal wires.

The signal wire *d* in this exemplary circuit serves to transmit signals to the repeater Ug a wire. In the repeater Ug leads, to the negative pole of the operating voltage source via the switching grid KF and a relay Z, or via a relay contact *k*, directly to ground which can break within 140 msec. after seizing the repeater Ug. This wire can therefore be checked only if it reaches the repeater Ug. Therefore, an additional voltage source VZ, which floats above ground potential, and a normal grounded resistor RN in series connected to the signal wire *d*. An indicator J1, which also serves to suppress interfering peak voltages, supervises the current flow at the resistor RN when the repeater Ug is reached. If said repeater has not been reached the indicator J1 recognizes a fault. For example, the indicator J1 does not respond, if the terminal resistance in the repeater is equal to or is greater than 2.5K ohms.

The signal wire *e* serves to transmit start signals, counting signals and other signals in the backward direction. Said signal wire is normally terminated in the outgoing or forward direction via the element C4, R3, or grounded through a contact *t* which can also break within 140 msec. For example, contact *t* can be a contact on a seizure relay. Thus, a ground would be applied to wire *c* to indicate an idle condition and an absence of ground would indicate a busy condition after the repeater Ug has been seized. By measuring the impedance from said signal wire *e* to ground the signal wire is checked on its terminal resistance. As contact *t* connects the signal wire *e* to ground it can only be checked when contact *t* breaks.

The impedance measuring device for use in connection with wire *e* shows a transformer U3. The primary winding of transformer Ug is connected with the generator G3 via a series resisitor RV1, while its grounded secondary winding is connected with the signal wire *e*. An indicator J2 with a top threshold value is connected to said transformer and indicates if a defined voltage is exceeded. The defined voltage level is determined by the top tolerance limit of the impedance of element C4, R3. In practice then, the voltage at J2 starts at zero while contacts F is closed and goes up to a value determined by the series impedance provided by C4, R3.

The signal wire *f* is a spare wire which is not terminated when the other tests are being accomplished but must be checked simultaneously with the other tests. The signal wire *f* is fed from grounded generator G4 via resistor RV2. The resistor RV2 has an extremely high resistance. The voltage drop at the elements C5, R4 is measured by indicator J3. Deviations of leakage resistor R4 are thus determined.

If four wire circuits are used in the system, a second combined impedance and symmetry measuring device must be connected to the second pair of speech wires, so that all wires of a connecting line or link can be checked at a time.

The checking device P is connected while establishing a telephone connection for a period, sufficient to obtain the measurements. When the routiner or checking device P is connected, the generators G1, G2, G3 and G4 provide the various currents necessary to implement the test procedures. Measuring device M1 determines the value of leakage between the leads *a*, *b* or if there is an open or a short in the circuit comprising lead *a*, lead load R3, and lead *b*.

While measuring device M1 is operating measuring device M2 determines the symmetry of the circuit comprising lead *a*, load R3 and lead *b*. That is, measuring device M2 responds to differences between the current flowing through lead *a* and lead *b*. These differences can be caused by an open in lead *a* or an open in lead *b* or if either lead *a* or lead *b* is grounded or short circuited to signal leads causing a variation in the value of leakage resistors R1, R2 respectively.

Simultaneously, the impedance between signal leads such as leads *e* and *f* not normally coupled to voltage source and ground is determined. Also, at the same time the current through any of the signal leads such as lead *d* normally connected to a voltage source is determined. From each of these determinations the exact condition of the connections are ascertained. For example, if measuring device M1 indicates a variation in lead R3 this variation condition is caused if either lead *a* or lead *b* are shorted together, are open or shorted to ground, or shorted to any of the signal leads. If there is no change in symmetry as indicated by measuring device M2 then the variation in the lead of measuring device M1 would be caused only if leads *a* and *b* were shorted together. If there is no variation in the indication of device M1 but there is a variation in device M2 this would indicate that one of the leads *a*, *b* is shorted to one of the signal wires. The short between one of the speech leads and one of the signal leads would be discovered in one of the meters connected to the signal leads.

Note that when the marker, serving the switching grid KF has given the cut-through order to said switching grid K*f*, the routiner P checks the different repeaters without the necessity to switch over the checking device P to individually check the various leads. Also, since all wires are checked simultaneously a short checking time is achieved. Such a checking is of importance particularly in conjunction with switching grids directed to telephone traffic to undersea repeaters, because they represent expensive telephone connections.

While the principles of the invention have been described above in connection with specific apparatus and applications, it is to be understood that this description is made only by way of example and not as a limitation on the scope of the invention.

We claim:

1. A circuit arrangement for checking connections in telephone exchange systems,
   - said connections comprising switching grids for cutting through the speech and signal leads of said exchange system and the leads leading from said switching grids to remote repeaters,
   - said arrangement comprising checking means,
   - means for connecting said checking means to said speech and signal leads,
   - said checking means comprising means for assuring individual series resistance capacitance means between each of said signal leads and ground, and
   - testing means for simultaneously testing said speech leads for shorts and for opens.

2. The arrangement of claim 1 wherein said testing means comprises a first and a second generator for generating currents having first and second frequencies respectively, first and second frequency selectively measuring devices, first and second coupling means for coupling said first and second generator means and said first and second frequency selective measuring devices to said speech leads so that said frequency selective measuring devices determine the leakage resistance between said speech leads and said second frequency selective device determines the leakage resistance between each of the speech leads and ground.

3. The circuit arrangement of claim 2 wherein said first coupling device comprises a first transformer, said first transformer having at least two primary and two secondary windings, said second coupling device comprising inductance means, means for coupling one side of each of said at least two secondary windings to said inductance means, means for coupling the other side of said at least two secondary windings to said speech leads, means for connecting said first generator means to one of said at least two primary windings, means for connecting said secondary generator means to a mid-point in said inductance means so that the current generated by said second generator means flows in opposite directions through each of said two secondary windings, means for sensing said secondary windings so that the current generated by said first generator means flows through said secondary windings in the same direction, means for connecting said first frequency selective measuring means across one of said at least two primary windings, and means for connecting said second frequency selective measuring means across said inductance means.

4. The circuit arrangement of claim 3 wherein said second frequency selective measuring device comprises differential amplifier means for sensing the difference in the currents generated by said second generator means flowing in each of said speech leads.

5. The circuit arrangement of claim 3 wherein said second coupling means comprises two transformer means, said second transformer means having a primary winding and a secondary winding, means for connecting said second generator means across said primary winding, means for grounding said secondary winding at its mid-point, means for sensing said secondary winding so that the current generated by said secondary winding in said primary winding flows in opposite directions through said speech leads.

6. A circuit arrangement according to claim 5 wherein additional voltage source means are provided, means including normal resistance means for connecting said additional voltage source to ground, means for connecting said additional voltage means to said signal lead which is connected to negative battery at the other side of said switching grid, and meter means coupled across said normal resistance means to determine the current flowing through said normal resistance means.

7. A circuit arrangement according to claim 6 wherein third generator means are provided, said third transformer means for coupling said third generator to the normal grounded one of said signal leads, second meter means connected between said signal lead and ground for determining the impedance between the signal lead and ground during the periods when said signal lead is ungrounded.

8. A circuit arrangement according to claim 7 wherein fourth generator means are provided, series resistor means for coupling said fourth generator means to an extra one of said signal wires, meter means connected from the coupling point of said series resistor and said extra signal lead and ground for determining the impedance between said signal lead and ground.

References Cited

UNITED STATES PATENTS

| | | | |
|---|---|---|---|
| 2,414,612 | 1/1947 | Ross | 179—175.3 |
| 3,287,633 | 11/1966 | Mollo | 324—51 |
| 3,354,389 | 11/1967 | Hordosi | 324—51 |

KATHLEEN H. CLAFFY, Primary Examiner

ALBERT B. KIMBALL, Jr., Assistant Examiner

U.S. Cl. X.R.

179—175.3; 324—51